US009465937B1

(12) United States Patent
Spiegel et al.

(10) Patent No.: US 9,465,937 B1
(45) Date of Patent: Oct. 11, 2016

(54) METHODS AND SYSTEMS FOR SECURELY MANAGING FILE-ATTRIBUTE INFORMATION FOR FILES IN A FILE SYSTEM

(75) Inventors: Mark Spiegel, West Hills, CA (US); David Buches, Westlake Village, CA (US); Patrick Gardner, Northridge, CA (US); David Kane, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1595 days.

(21) Appl. No.: 12/130,616

(22) Filed: May 30, 2008

(51) Int. Cl.
G06F 17/30 (2006.01)
G06F 21/56 (2013.01)

(52) U.S. Cl.
CPC .................... G06F 21/56 (2013.01)

(58) Field of Classification Search
USPC ......................................................... 707/634
See application file for complete search history.

(56) References Cited

U.S. PATENT DOCUMENTS

| 7,100,072 | B2* | 8/2006 | Galipeau et al. ................. 714/6 |
| 7,155,465 | B2* | 12/2006 | Lee et al. |
| 7,370,234 | B2* | 5/2008 | Stakutis et al. ................. 714/15 |
| 7,437,759 | B1* | 10/2008 | Szor ................................ 726/22 |
| 7,730,533 | B1* | 6/2010 | Sobel et al. ..................... 726/22 |
| 8,141,153 | B1* | 3/2012 | Gardner et al. ................. 726/22 |
| 2002/0049925 | A1* | 4/2002 | Galipeau et al. ................. 714/6 |
| 2003/0225792 | A1* | 12/2003 | Schiller et al. ............ 707/104.1 |
| 2004/0210608 | A1* | 10/2004 | Lee et al. ....................... 707/204 |
| 2005/0097143 | A1* | 5/2005 | Pudipeddi et al. ........... 707/200 |
| 2005/0177687 | A1* | 8/2005 | Rao ..................... G06F 12/0897 711/118 |
| 2006/0075041 | A1* | 4/2006 | Antonoff et al. .............. 709/206 |
| 2006/0085666 | A1* | 4/2006 | Stakutis et al. ..................... 714/2 |
| 2006/0130141 | A1* | 6/2006 | Kramer et al. .................. 726/23 |
| 2006/0137010 | A1* | 6/2006 | Kramer et al. .................. 726/22 |
| 2006/0161988 | A1* | 7/2006 | Costea et al. ................... 726/25 |
| 2006/0236392 | A1* | 10/2006 | Thomas et al. .................. 726/23 |
| 2007/0174911 | A1* | 7/2007 | Kronenberg et al. ........... 726/22 |
| 2008/0034429 | A1* | 2/2008 | Schneider ........................ 726/23 |
| 2008/0047013 | A1* | 2/2008 | Claudatos et al. .............. 726/24 |
| 2008/0052328 | A1* | 2/2008 | Widhelm et al. .............. 707/204 |
| 2008/0077571 | A1* | 3/2008 | Harris et al. ...................... 707/5 |
| 2008/0222153 | A1* | 9/2008 | Naresh et al. ..................... 707/9 |
| 2008/0256636 | A1* | 10/2008 | Gassoway ........................ 726/24 |
| 2009/0287653 | A1* | 11/2009 | Bennett .............................. 707/3 |
| 2009/0328221 | A1* | 12/2009 | Blumfield et al. .............. 726/24 |

OTHER PUBLICATIONS

Article entitled "McObject's New Embedded Database Kernel Mode to Provide Highest Level of Performance and Determinism", dated Apr. 2, 2008, by McObject.*

(Continued)

*Primary Examiner* — Mahesh Dwivedi
(74) *Attorney, Agent, or Firm* — ALG Intellectual Property, LLC

(57) ABSTRACT

A computer-implemented method for securely managing file-attribute information for files in a file system may comprise: 1) identifying at least one file, 2) identifying file-attribute information that identifies at least one file attribute for the file, 3) identifying volatile metadata associated with the file that contains file-attribute information, 4) determining that the file has been modified, and 5) automatically deleting the volatile metadata. Corresponding systems and computer-readable media are also disclosed.

17 Claims, 7 Drawing Sheets

(56) References Cited

OTHER PUBLICATIONS

Article entitled "Single-File Cross Platform Database", dated Nov. 13, 2007, by SQLite.*

Manual entitled "Symantec Endpoint Protection Getting Started Guide" by Symantec, Copyright 2007.*

Manual entitled "Administration Guide for Symantec Endpoint Protection and Symantec Network Access Control" by Symantec, Copyright 2007.*

Article entitled Loading and Unloading Miniflters, by Microsoft, Copyright 2004.*

Article entitled "File System Filter Drivers", by Microsoft, dated Oct. 11, 2005.*

* cited by examiner

METHODS AND SYSTEMS FOR SECURELY MANAGING FILE-ATTRIBUTE INFORMATION FOR FILES IN A FILE SYSTEM

BACKGROUND

Many computer-security software programs require the ability to persist data associated with a given file. For example, security software may store one or more attributes of a file as metadata to the file. Examples of attributes that may be stored as metadata to a file include a last-scanned date, a last-modified date, a hash, a digital signature, or file-ancestry information for the file.

Unfortunately, many security software solutions are unable to determine the reliability of such metadata without spending valuable processor time checking or recalculating the metadata. However, without verifying the validity or reliability of such metadata, security software may not know whether such metadata is legitimate or valid.

SUMMARY

As will be described in greater detail below, the instant disclosure generally relates to systems and methods for securely managing file-attribute information for files in a file system. For example, file-attribute information for a file may be securely managed by: 1) creating and storing volatile metadata that contains information that identifies at least one attribute of the file (file-attribute information), 2) determining that the file has been modified, and 3) automatically deleting the volatile metadata.

The exemplary methods and systems described herein may determine that a file has been modified in a variety of ways. In one example, the system may determine that a file has been modified by: 1) installing a boot-time device driver to load as early as possible in a computing-system's boot process, 2) registering a file-system minifilter for the boot-time device driver at a low minifilter altitude, and 3) identifying, using the file-system minifilter and the boot-time device driver, modifications to the file. As file modifications are identified, the system may delete volatile metadata associated with the file and/or update non-volatile metadata associated with the file. In one example, the volatile metadata may contain information about the file that may be useful to a security software program (such as a hash of the file, a reliable last-modified date, a last-scanned date, file-ancestry information, a digital signature for the file, or the like).

In certain examples, the volatile metadata may be stored in a file-attribute-information database, such as a kernel-mode database. This file-attribute-information database may represent a single database file. In addition, access to this file-attribute-information database may be limited to applications having administrative-access rights.

Exemplary systems and methods for managing file-attribute information in an environment in which a boot-time device driver and/or a minifilter may not be loaded are also disclosed. In this embodiment, file-attribute information for files in a file system may be securely managed by: 1) determining, by analyzing a file-system change journal, that at least one file in the file system has been modified and then 2) automatically deleting volatile metadata associated with the file that contains file-attribute information.

In this example, the file-system change journal (which may represent a NTFS change journal or any other file-system's change journal) may track information regarding modifications to files made from within a removable-storage-device environment (such as a USB drive), a non-NTFS operating-system environment (such as within a LINUX environment), an operating-system safe-mode environment, or the like.

Systems and computer-readable media corresponding to the above-described methods are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
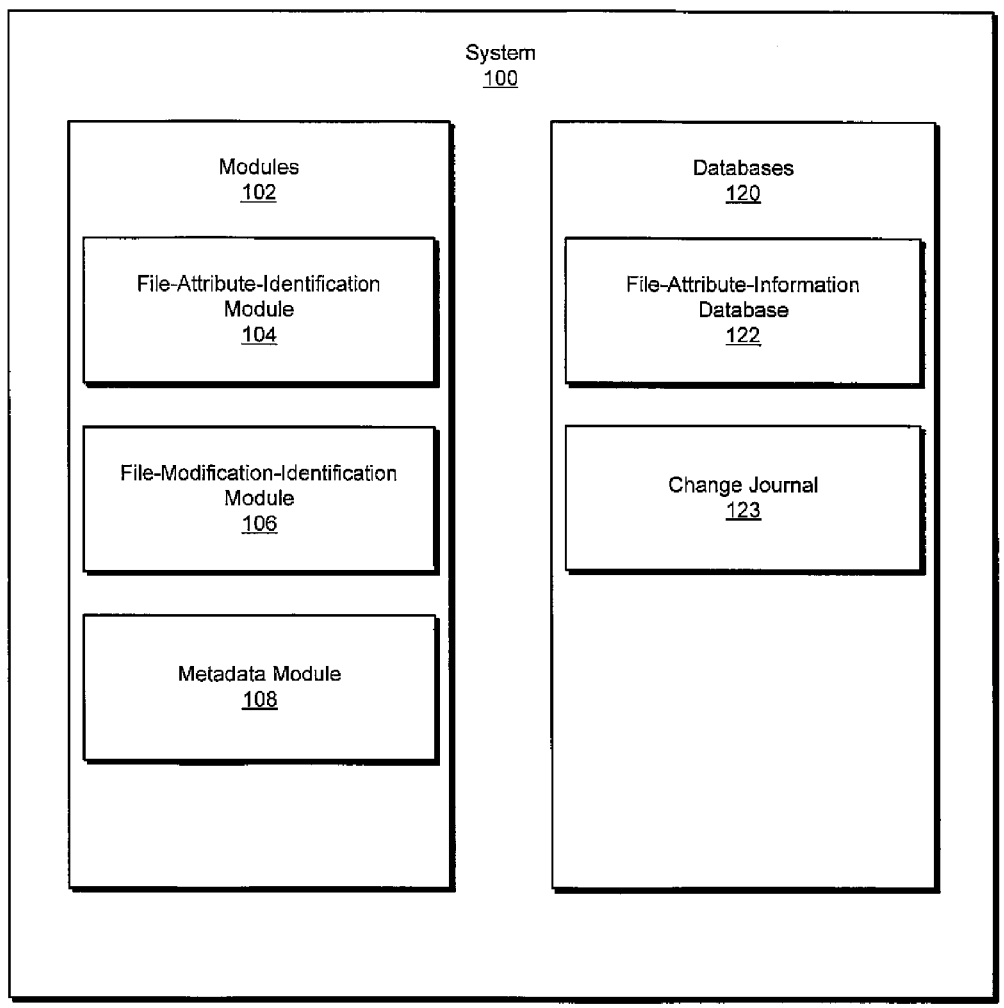
FIG. 1A is a block diagram of an exemplary system for securely managing file-attribute information for files in a file system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for securely managing file-attribute information for files in a file system. In particular, the following will provide, with reference to FIGS. 1A, 1B, and 4, detailed descriptions of exemplary systems for securely managing file-attribute information for files in a file system. A description of exemplary files in a file system will be provided in connection with FIG. 3. In addition, detailed descriptions of corresponding exemplary computer-implemented methods will also be provided in connection with FIGS. 2 and 5.

FIG. 1A is a block diagram of an exemplary system 100 for securely managing file-attribute information for files in a file system. As illustrated in this figure, exemplary system 100 may comprise one or more modules 102 for performing one or more tasks. For example, as will be described in greater detail below, exemplary system 100 may comprise a file-attribute-identification module 104 for identifying attributes of a file.

Exemplary system 100 may also comprise a file-modification-identification module 106 for determining that a file has been modified. In addition, exemplary system 100 may comprise a metadata module 108 for creating and managing volatile and non-volatile metadata associated with the file. Although illustrated as separate modules, one or more of modules 102 in FIG. 1A may represent portions of a single module.

As illustrated in FIG. 1, exemplary system 100 may also comprise one or more databases 120. For example, exemplary system 100 may comprise a file-attribute-information database 122 for storing file-attribute information for one or more files. Exemplary system 100 may also comprise a change journal 123 for providing a persistent log of changes made to files on a volume. Although illustrated as separate devices, one or more of databases 120 in FIG. 1A may represent portions of a single database or a single computing device.

Figure 1B:
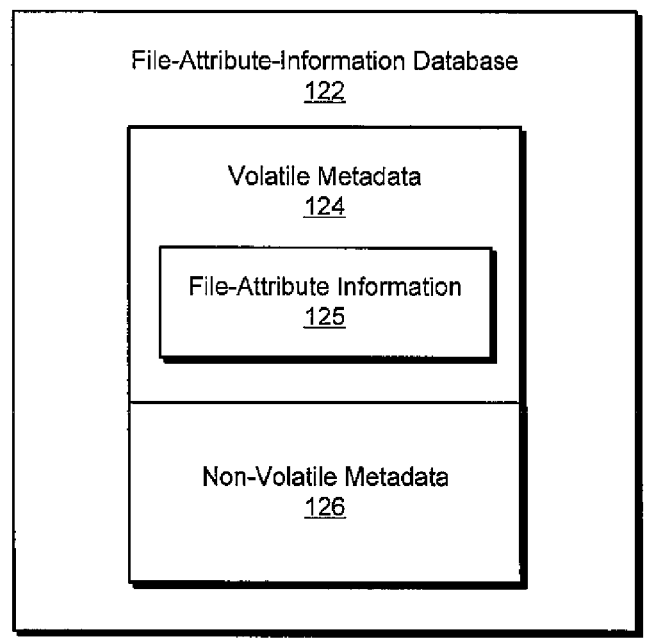
FIG. 1B is a block diagram of an exemplary file-attribute-information database for storing file-attribute information.

FIG. 1B is a block diagram of file-attribute-information database 122 from FIG. 1A. File-attribute-information database 122 generally represents any type or form of database capable of storing volatile metadata containing file-attribute information for one or more files. In at least one embodiment, file-attribute-information database 122 may represent a kernel-mode database. In certain embodiments, access to file-attribute-information database 122 in FIG. 1B may be limited to devices or users with administrative-access rights.

As illustrated in FIG. 1B, file-attribute-information database 122 may comprise volatile metadata 124 and non-volatile metadata 126. As will be described in greater detail below, volatile metadata 124 may contain file-attribute information 125 for one or more files. As used herein, the phrase "file-attribute information" generally refers to information that identifies one or more attributes of a file. Examples of file-attribute information include, without limitation, a digital signature for a file, a hash for a file, a last-scan date for a file, file-ancestry information for a file, or any other potentially useful information.

In certain embodiments, one or more of modules 102 in FIG. 1A may represent one or more software applications or programs that, when executed by a computing device, may cause the computing device to securely manage file-attribute information for files in a file system. For example, as will be described in greater detail below, one or more of modules 102 may represent software modules configured to run on one or more computing devices, such as exemplary computing system 610 in FIG. 6 and/or portions of exemplary network architecture 700 in FIG. 7. One or more of modules 102 may also represent all or portions of one or more special-purpose computers configured to perform one or more tasks required to securely manage file-attribute information for files in a file system.

Figure 3:
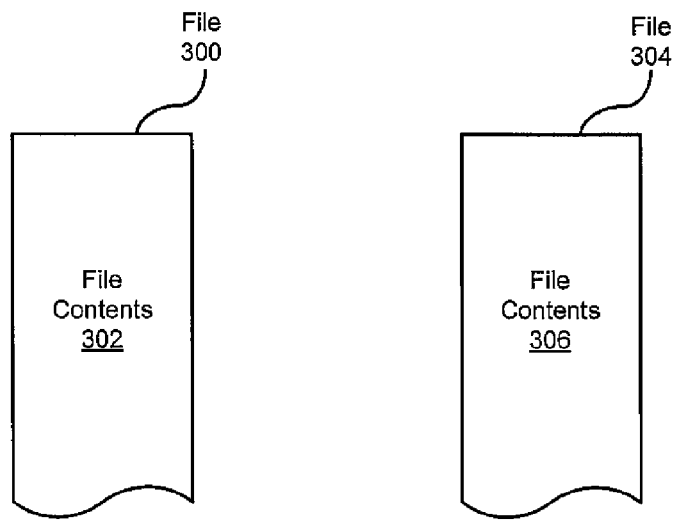
FIG. 3 is a block diagram of an exemplary file in a file system.
Figure 2:
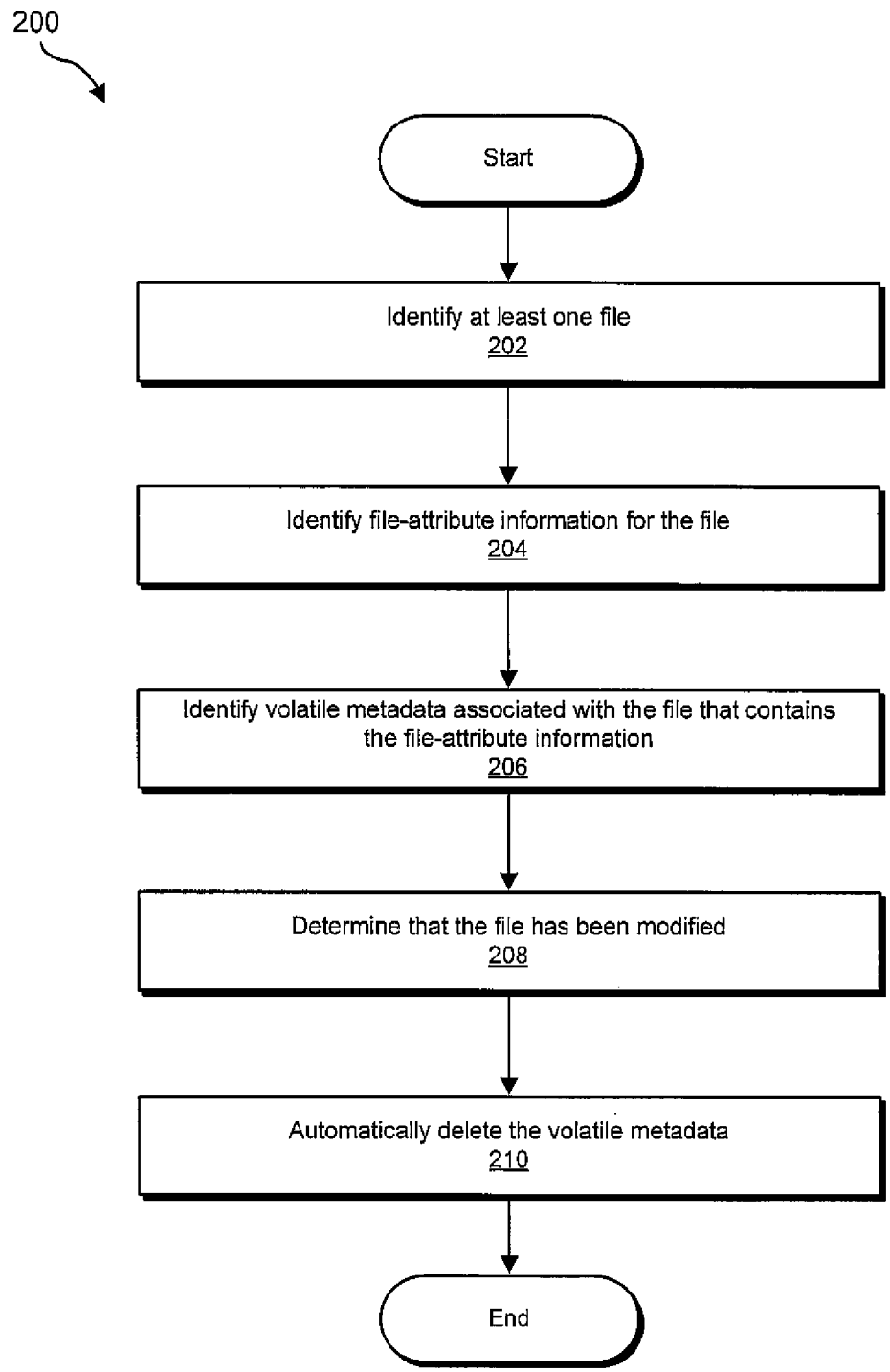
FIG. 2 is a flow diagram of an exemplary computer-implemented method for securely managing file-attribute information for files in a file system.

FIG. 2 is a flow diagram of an exemplary computer-implemented method 200 for securely managing file-attribute information for files in a file system. As illustrated in this figure, at step 202 at least one file may be identified. For example, exemplary system 100 in FIG. 1A may identify a first file 300 and/or a second file 304 in FIG. 3. As illustrated in FIG. 3, first file 300 and second file 304 may contain file contents 302 and 306, respectively.

At step 204, file-attribute information for the file identified in step 202 may be identified. For example, file-attribute-identification module 104 in FIG. 1A may identify file-attribute information for first file 300 in FIG. 3. As detailed above, the file-attribute information may identify at least one file attribute for the file.

Step 204 in FIG. 2 may be performed in a variety of ways. In certain embodiments, file-attribute-identification module 104 in FIG. 1A may identify file-attribute information 125 in FIG. 1B stored as volatile metadata 124 in file-attribute-information database 122. In this example, file-attribute information 125 may identify one or more attributes of the first file 300 in FIG. 3.

At step 206, volatile metadata associated with the file identified in step 202 may be identified. In at least one embodiment, this volatile metadata may contain file-attribute information for the file identified in step 202. For example, metadata module 108 in FIG. 1A may identify volatile metadata 124 in FIG. 1B containing file-attribute information 125 associated with first file 300 in FIG. 3.

Step 206 in FIG. 2 may be performed in a variety of ways. For example, in certain embodiments, step 206 may comprise searching a file-attribute-information database for the volatile metadata associated with the file and then accessing the volatile metadata. For example, metadata module 108 in FIG. 1A may search file-attribute-information database 122 in FIG. 1B for volatile metadata 124 containing file-attribute information 125 that is associated with first file 300 in FIG. 3.

In an additional embodiment, step 206 may comprise creating the volatile metadata associated with the file and then storing the volatile metadata in a file-attribute-information database. For example, upon identifying file-attribute information for a file, metadata module 108 in FIG. 1A may create volatile metadata 124 in FIG. 1B containing file-attribute information 125 and store the same within file-attribute-information database 122.

In certain embodiments, volatile metadata 124 in FIG. 1B may be stored as a single file within file-attribute-information database 122. Similarly, in at least one embodiment, file-attribute-information database 122 may represent a single database file.

Figure 4:
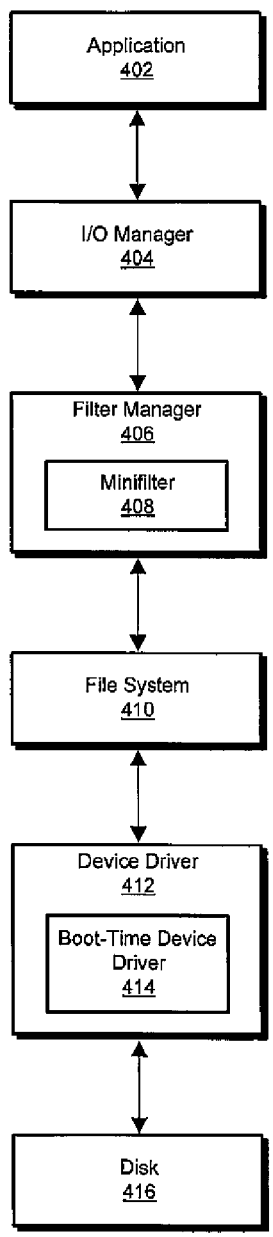
FIG. 4 is a block diagram of an exemplary file system stack.

At step 208, the system may determine whether the file identified in step 202 has been modified. Step 208 may be performed in a variety of ways. In one example, the system may determine whether a file has been modified by: 1) installing a boot-time device driver, 2) registering a file-system minifilter for the boot-time device driver, and 3) identifying, using at least one of the file-system filter and the boot-timed device driver, at least one modification to the file. For example, file-modification-identification module 106 in FIG. 1A may install a boot-time device driver 414 within the device-driver level 412 in a file system stack 400 as illustrated in FIG. 4. In at least one embodiment, file-modification-identification module 106 in FIG. 1A may install boot-time device driver 414 to load as early as possible in a system-boot process. For example, file-modification-identification module 106 may require, during installation, that boot-time device driver 414 load earlier than all non-system-critical drivers within a computing system.

File-modification-identification module 106 may then register a file-system minifilter, such as minifilter 408 in FIG. 4 for boot-time device driver 414. In at least one embodiment, file-modification-identification module 106 may register minifilter 408 at the lowest possible minifilter altitude. For example, file-modification-identification module 106 may register minifilter 408 at an altitude that is lower than all other non-allocated altitudes.

In at least one embodiment, requiring the boot-time device driver to load earlier than all other non-system-critical drivers and registering the file-system minifilter at an altitude that is lower than all other non-allocated altitudes may enable exemplary system 100 in FIG. 1A to identify write requests from drivers in file system stack 400 in FIG. 4. For example, a write request generated at an application level 402 in FIG. 4 for first file 300 in FIG. 3 stored on disk 416 in FIG. 4 may be identified by minifilter 408 as it is passed from application level 402 to I/O manager 404 to filter manager 406.

Upon determining that the file has been modified at step 208, at step 210 the volatile metadata associated with the file may be automatically deleted. For example, metadata module 108 in FIG. 1A may, after file-modification-identification module 106 determines that file contents 302 of first file 300 in FIG. 3 have been modified, automatically delete volatile metadata 124 in FIG. 1B containing file-attribute information 125 for first file 300. Upon completion of step 208, exemplary method 200 may terminate.

Although described and illustrated with a certain degree of particularity, exemplary method 200 in FIG. 2 may omit one or more of the steps described or illustrated herein and/or include additional steps in addition to those disclosed. For example, although not illustrated in FIG. 2, exemplary method 200 may also comprise identifying non-volatile metadata associated with a file and then, after determining that the file has been modified, updating the non-volatile metadata based at least in part on the modifications made to the file. For example, metadata module 108 in FIG. 1A may, after file-modification-identification module 106 determines that file contents 302 of first file 300 in FIG. 3 have been modified, update information stored in non-volatile metadata 126 in FIG. 1B. As with volatile metadata 124, non-volatile metadata 126 generally represents any type or form of data relating to first file 300 in FIG. 3. For example, non-volatile metadata 126 may contain information that identifies the size of first file 300, the creation date of first file 300, access rights for first file 300, or any other potentially useful information.

In an additional embodiment, exemplary system 100 in FIG. 1A may gather operating-system-provided stream contexts for files and then store the same for efficient lookup to minimize queries to file-attribute-information database 122 in FIG. 1B. For example, metadata module 108 in FIG. 1A may wait until file-modification-identification module 106 determines that a plurality of files (such as first file 300 and second file 304 in FIG. 3) have been modified prior to accessing file-attribute-information database 122 in FIG. 1B. In this example, metadata module 108 in FIG. 1A may, after file-modification-identification module 106 determines that contents 302 and 306 of first file 300 and second file 304, respectively, have been modified, automatically delete volatile metadata 124 associated with first file 300 and second file 304 from file-attribute-information database 122 in FIG. 1B.

The exemplary systems and methods described and illustrated herein provide mechanisms for securely and efficiently managing file-attribute information for files in a file system. In certain embodiments, these exemplary systems and methods may increase security and result in performance gains and features. For example, by automatically deleting volatile metadata associated with a file when the file is modified, the exemplary systems and methods described and illustrated herein may ensure the reliability of metadata associated with files in a file system.

Figure 5:
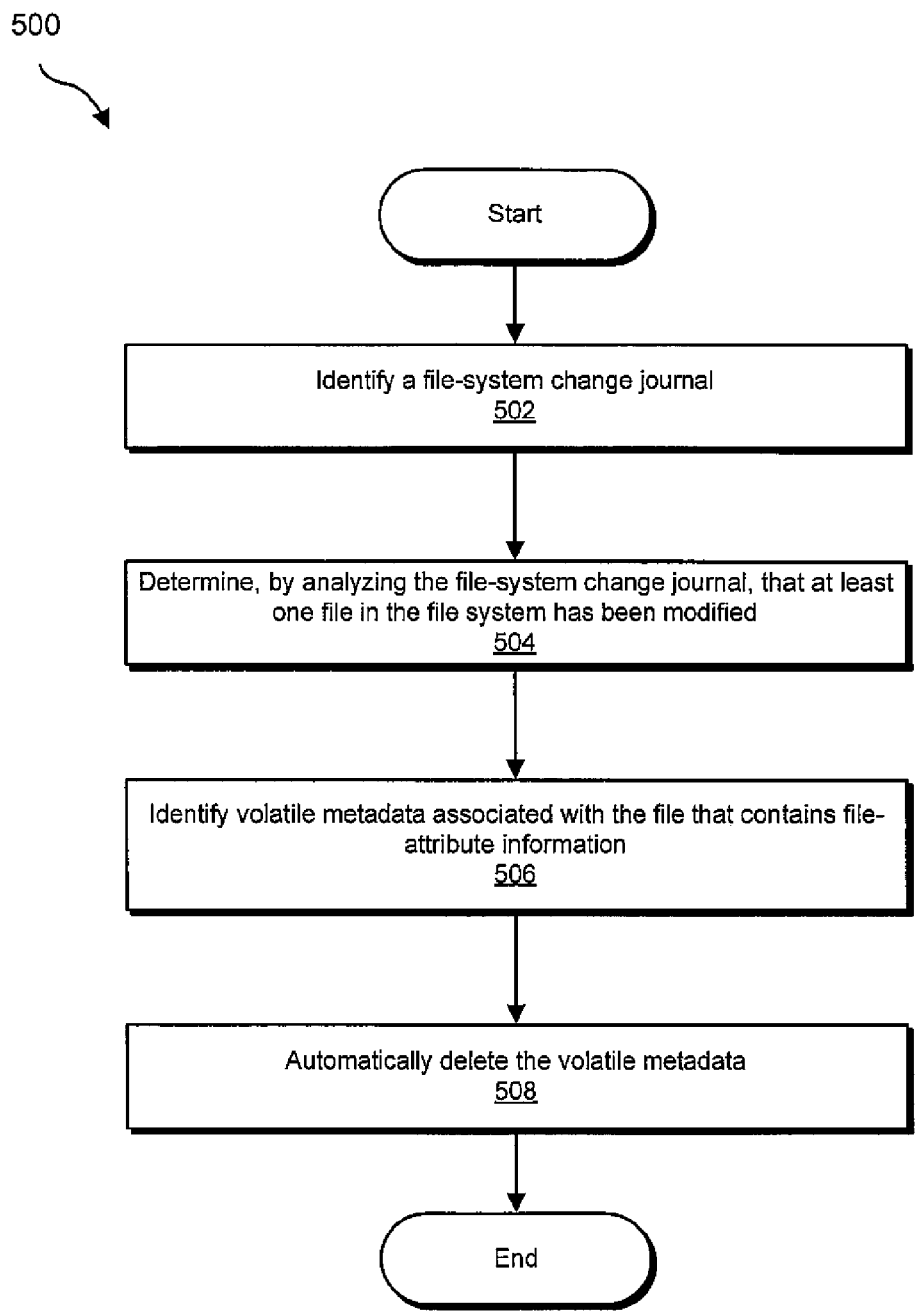
FIG. 5 is a flow diagram of an exemplary computer-implemented method for securely managing file-attribute information for files in a file system.

As detailed above, the instant disclosure also provides systems and methods for securely managing file-attribute information in an environment in which boot-time device driver 414 may not load. FIG. 5 is a flow diagram of an exemplary computer-implemented method 500 for managing file-attribute information for files in such an environment. As illustrated in this figure, at step 502 a file-system change journal may be identified. For example, file-modification-identification module 106 in FIG. 1A may identify change journal 123. Change journal 123 generally represents any type or form of file-system change journal capable of providing a persistent log of changes made to files on a volume. For example, change journal 123 may track information about added, deleted, and modified files for a volume. In at least one embodiment, change journal 123 in FIG. 1A may represent an NTFS change journal.

Returning to FIG. 5, at step 504 the system may determine, by analyzing the file-system change journal, that at least one file in the file system has been modified. For example, file-modification-identification module 106 in FIG. 1A may determine, by analyzing change journal 123, that first file 300 in FIG. 3 has been modified.

In certain embodiments, change journal 123 may track information about modifications to files in a file system, even if a boot-time device driver, such as boot-time device driver 414, in FIG. 4, is not loaded. For example, change journal 123 may identify changes to files in a file system in a removable-storage-device environment, a non-NTFS operating-system environment, an operating-system safe-mode environment, or any other environment in which a boot-time device driver, such as boot-time device driver 414 in FIG. 4, may be prevented from loading.

Returning to FIG. 5, at step 506 the system may identify volatile metadata associated with the file that contains file-attribute information for the file. For example, metadata module 108 in FIG. 1A may identify file-attribute information 125 in FIG. 1B for first file 300 in FIG. 3 stored as volatile metadata 124 in FIG. 1B within file-attribute-information database 122 in FIG. 1B.

At step 508, the system may automatically delete the volatile metadata. For example, metadata module 108 in FIG. 1A may, after file-modification-identification module 106 determines that file contents 302 of first file 300 in FIG. 3 have been modified, automatically delete volatile metadata 124 in FIG. 1B for first file 300 from file-attribute-information database 122 in FIG. 1B.

Figure 6:
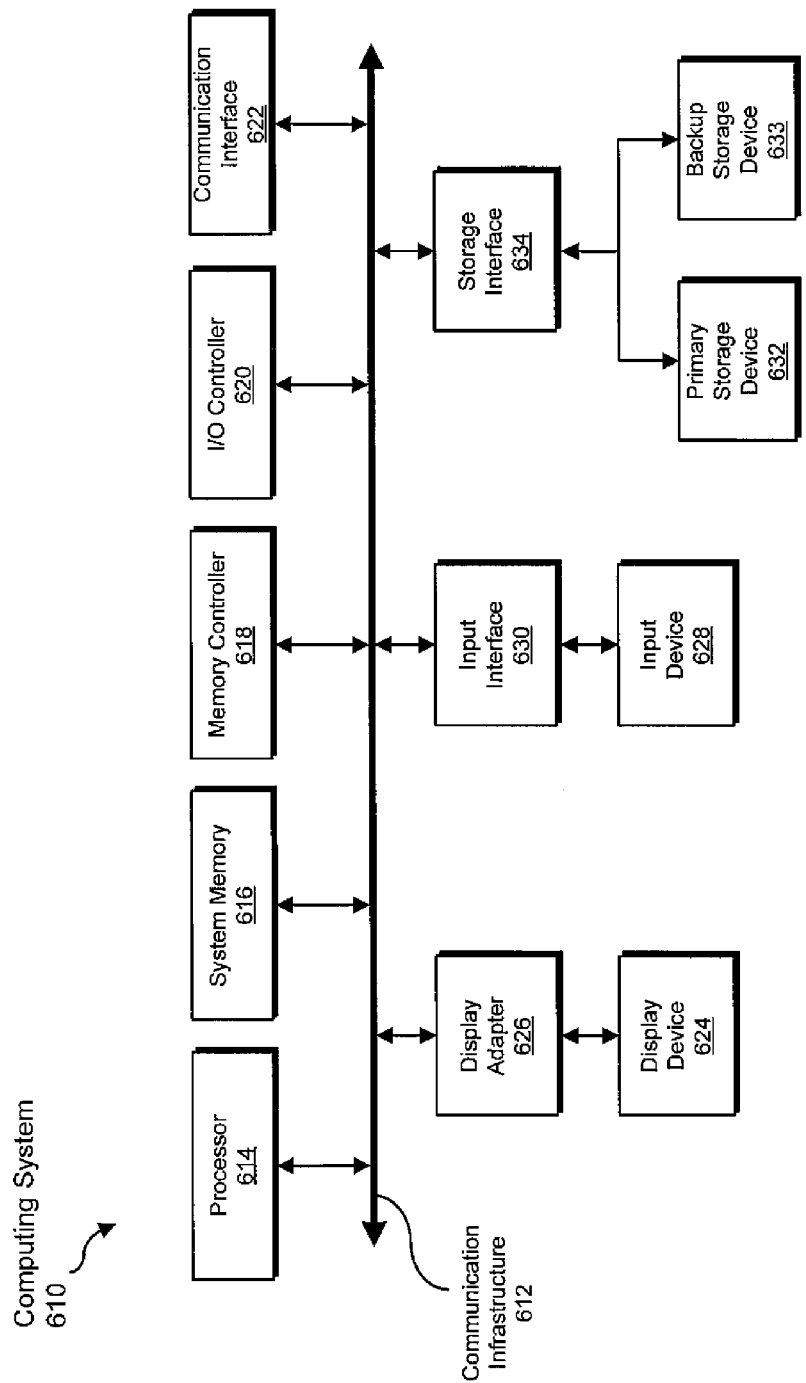
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, determining, deleting, installing, registering, requiring, creating, storing, searching, accessing, and updating steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, determining, deleting, installing, registering, requiring, creating, storing, accessing, and updating.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for identifying, determining, deleting, installing, registering, requiring, creating, storing, searching, accessing, and updating steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless IEEE 802.11 network), a personal area network (such as a BLUETOOTH network or an IEEE 802.15 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, determining, deleting, installing, registering, requiring, creating, storing, searching, accessing, and updating steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, determining, deleting, installing, registering, requiring, creating, storing, searching, accessing, and updating steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the identifying, determining, deleting, installing, registering, requiring, creating, storing, searching, accessing, and updating steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 7 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
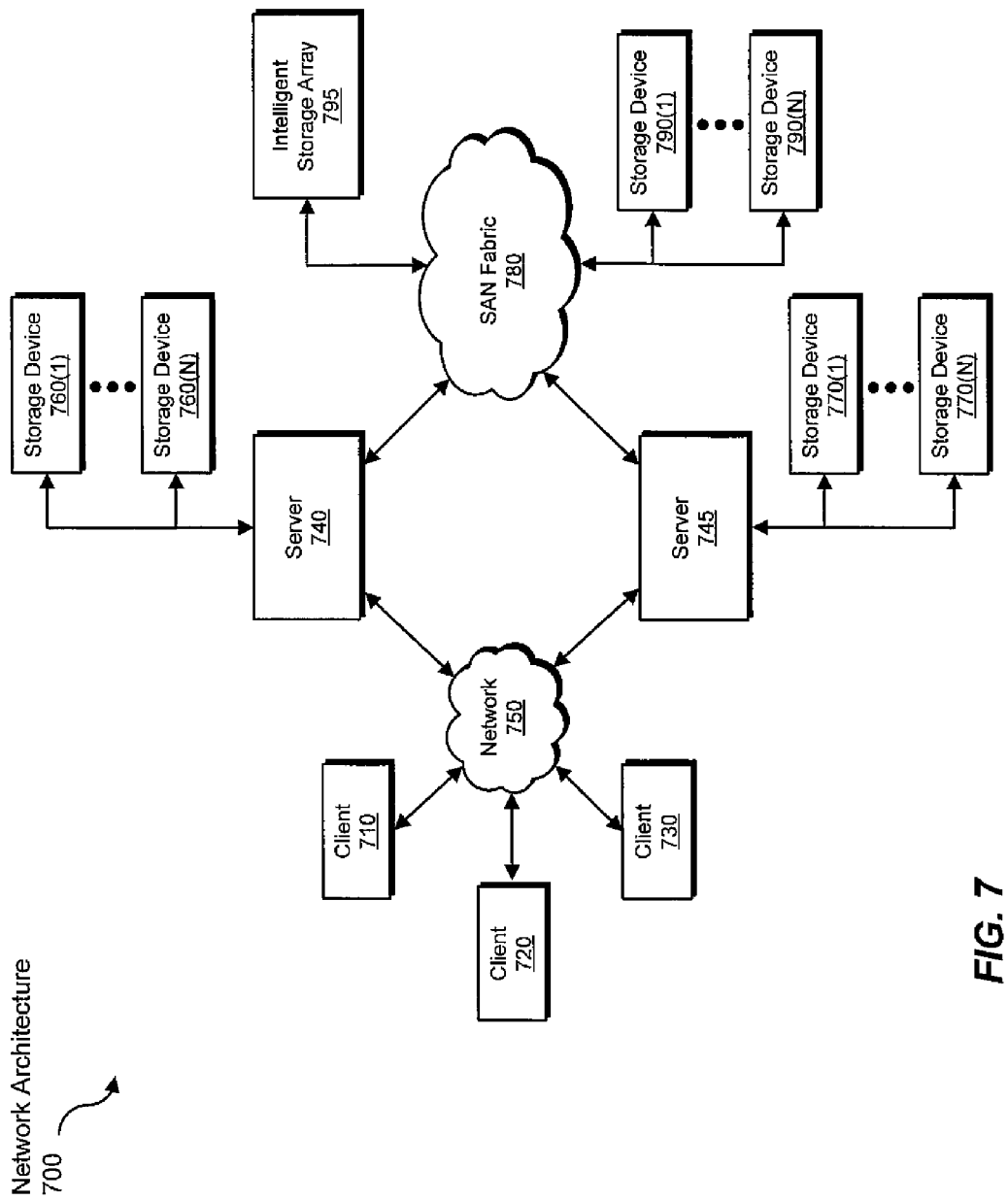
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795.

Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, determining, deleting, installing, registering, requiring, creating, storing, searching, accessing, and updating steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing either alone or in combination with other elements, one or more of the exemplary methods described and/or illustrated here in. For example, a computer-implemented method for securely managing file-attribute information for files in a file system may comprise identifying at least one file, identifying file-attribute information for the file that identifies at least one file attribute, identifying volatile metadata associated with the file (wherein the volatile metadata may comprise the file-attribute information), determining that the file has been modified, and then automatically deleting the volatile metadata. Identifying the volatile metadata may comprise searching a file-attribute-information database for the volatile metadata and accessing the volatile metadata.

Identifying the file-attribute-information may comprise identifying at least one of: a last-scanned date for the file, a last-modified date for the file, a hash for the file, a digital signature for the file, and file-ancestry information for the file.

In certain embodiments, determining that the file has been modified may comprise installing a boot-time device driver, registering a file-system minifilter for the boot-time device driver, and identifying, using at least one of the file-system minifilter and the boot-time device driver, at least one modification to the file. Installing the boot-time device driver may require the boot-time device driver to load earlier than all other non-system-critical drivers. In a further embodiment, registering the file-system minifilter for the boot-time device driver may comprise registering the file-system minifilter at an altitude that is lower than all other non-allocated altitudes.

According to certain embodiments, identifying the volatile metadata may comprise creating the volatile metadata and storing the volatile metadata in a file-attribute-information database. Access to the file-attribute-information database may be limited to applications having administrative-access rights. In at least one embodiment, storing the volatile metadata may comprise storing the volatile metadata as a single file. The file-attribute-information database may be realized in many types and forms. The file-attribute-information database may be a kernel-mode database and may be a single database file.

Additional embodiments may further comprise identifying non-volatile metadata associated with the file being identified and updating the non-volatile metadata after determining that the file has been modified. Identifying the non-volatile metadata may comprise creating the non-volatile metadata and storing the non-volatile metadata in a file-attribute-information database. Updating the non-volatile metadata may comprise identifying at least one modification to the file and updating the non-volatile metadata based at least in part on the modification to the file.

In certain embodiments, determining that the file has been modified may comprise determining that a first file and a second file have been modified. In such an instance, automatically deleting the volatile metadata may comprise, after determining that both the first and the second file have been modified, automatically deleting volatile metadata associated with both the first file and the second file.

In an additional example, a computer-implemented method for securely managing file-attribute information for files in a file system may comprise identifying a file-system change journal, determining, by analyzing the file system change journal, that at least one file in the file system has been modified, identifying volatile metadata associated with the file (wherein the volatile metadata may comprise file-attribute information that identifies at least one file attribute for the file), and then automatically deleting the volatile metadata. In certain embodiments, the file-system change journal may be an NTFS change journal. The file may have been modified in at least one of: a removable-storage-device environment, a non-NTFS operating-system environment, and an operating-system safe-mode environment.

A further embodiment may comprise identifying at least one modification, to the file, identifying non-volatile metadata associated with the file, and, after determining that the file has been modified, updating the non-volatile metadata based at least in part on the modification to the file.

In connection with these methods, a computer-readable medium may comprise computer-executable instructions that cause the computing device to identify at least one file, identify file-attribute information that identifies at least one file attribute for the file, identify volatile metadata associated with the file (wherein the volatile metadata may comprise the file-attribute information), determine that the file has been modified, and automatically delete the volatile metadata.

While the foregoing disclosure sets forth various embodiments using specific block diagrams, flow diagrams, and examples, each block diagram component, flow diagram step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securely managing file-attribute information for files in a file system, the method comprising:
   identifying at least one file;
   identifying at least one file attribute of the file that would be useful to a security software program when analyzing the file;
   storing the file attribute as volatile metadata for the file that is automatically deleted when the same file is modified;
   ensuring that the security software program can rely upon the file attribute identified within the volatile metadata for the file by, upon determining that the file has been modified, automatically deleting the volatile metadata for the file in response to the determination that the same file has been modified;
   identifying non-volatile metadata associated with the file;
   after determining that the file has been modified, updating the non-volatile metadata.

2. The method of claim 1, wherein determining that the file has been modified comprises:
   installing a boot-time device driver;
   registering a file-system minifilter for the boot-time device driver;
   identifying, using at least one of the file-system minifilter and the boot-time device driver, at least one modification to the file.

3. The method of claim 2, wherein installing the boot-time device driver comprises requiring the boot-time device driver to load earlier than all other non-system-critical drivers.

4. The method of claim 2, wherein registering the file-system minifilter for the boot-time device driver comprises registering the file-system minifilter at an altitude that is lower than all other non-allocated altitudes.

5. The method of claim 1, wherein storing the file attribute as volatile metadata comprises:
   creating the volatile metadata;
   storing the volatile metadata in a file-attribute-information database.

6. The method of claim 5, further comprising limiting access to the file-attribute-information database to applications with administrative-access rights.

7. The method of claim 5, wherein storing the volatile metadata comprises storing the volatile metadata as a single file.

8. The method of claim 5, wherein the file-attribute-information database comprises a kernel-mode database.

9. The method of claim 5, wherein the file-attribute-information database comprises a single database file.

10. The method of claim 1, wherein updating the non-volatile metadata comprises:
    identifying at least one modification to the file;
    updating the non-volatile metadata based at least in part on the modification to the file.

11. The method of claim 1, wherein identifying the non-volatile metadata comprises:
    creating the non-volatile metadata;
    storing the non-volatile metadata in a file-attribute-information database.

12. The method of claim 1, wherein:
    determining that the file has been modified comprises:
      determining that a first file has been modified;
      determining that a second file has been modified;
    automatically deleting the volatile metadata comprises, after determining that both the first file and the second file have been modified, automatically deleting volatile metadata associated with both the first file and the second file.

13. The method of claim 1, wherein the file attribute comprises at least one of:
    a last-scanned date for the file;
    a last-modified date for the file;
    a hash for the file;
    a digital signature for the file;
    file-ancestry information for the file.

14. A computer-implemented method for securely managing file-attribute information for files in a file system, the method comprising:
    identifying a file-system change journal;
    determining, by analyzing the file-system change journal, that at least one file in the file system has been modified;
    identifying volatile metadata for the file that is automatically deleted when the same file is modified, wherein the volatile metadata identifies at least one file attribute of the file that would be useful to a security software program when analyzing the file;
    ensuring that the security software program can rely upon the file attribute identified within the volatile metadata for the file by automatically deleting the volatile metadata for the file in response to the determination that the same file has been modified;
    identifying non-volatile metadata associated with the file;
    after determining that the file has been modified, updating the non-volatile metadata.

15. The method of claim 14, wherein the file-system change journal is an NTFS change journal.

16. The method of claim 14, wherein the file was modified in at least one of:
    a removable-storage-device environment;
    a non-NTFS operating-system environment;
    an operating-system safe-mode environment.

17. A non-transitory computer-readable medium comprising one or more computer-executable instructions that, when executed by a computing device, cause the computing device to:
- identify at least one file;
- identify at least one file attribute of the file that would be useful to a security software program when analyzing the file;
- store the file attribute as volatile metadata for the file that is automatically deleted when the same file is modified;
- ensure that the security software program can rely upon the file attribute identified within the volatile metadata for the file by, upon determining that the file has been modified, automatically deleting the volatile metadata for the file in response to the determination that the same file has been modified;
- identify non-volatile metadata associated with the file;
- after determining that the file has been modified, update the non-volatile metadata.

* * * * *